United States Patent
Burgess et al.

(10) Patent No.: US 9,697,472 B2
(45) Date of Patent: Jul. 4, 2017

(54) SKILLS ONTOLOGY CREATION

(71) Applicant: LinkedIn Corporation, Mountain View, CA (US)

(72) Inventors: Matt Burgess, Ann Arbor, MI (US); Peter N. Skomoroch, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 269 days.

(21) Appl. No.: 14/296,258

(22) Filed: Jun. 4, 2014

(65) Prior Publication Data

US 2015/0088793 A1    Mar. 26, 2015

Related U.S. Application Data

(60) Provisional application No. 61/880,763, filed on Sep. 20, 2013.

(51) Int. Cl.
| | |
|---|---|
| *G06F 5/00* | (2006.01) |
| *G06N 5/00* | (2006.01) |
| *G06N 7/00* | (2006.01) |

(52) U.S. Cl.
CPC .................... *G06N 7/005* (2013.01)

(58) Field of Classification Search
CPC ............ G06N 5/04; G06N 7/005; G06N 5/02
See application file for complete search history.

(56) References Cited

U.S. PATENT DOCUMENTS

| | | |
|---|---|---|
| 6,289,340 B1 | 9/2001 | Puram et al. |
| 6,675,159 B1 | 1/2004 | Lin et al. |
| 7,310,676 B2 | 12/2007 | Bourne |
| 7,478,078 B2 | 1/2009 | Lunt et al. |
| 8,060,451 B2 | 11/2011 | Degeratu et al. |
| 8,650,177 B2 | 2/2014 | Skomoroch et al. |
| 2003/0128236 A1* | 7/2003 | Chen ................. G06F 17/30902 715/745 |

(Continued)

OTHER PUBLICATIONS

"U.S. Appl. No. 13/357,171, Non Final Office Action mailed Jun. 17, 2013", 9 pgs.

(Continued)

*Primary Examiner* — Michael B Holmes
*Assistant Examiner* — Kalpana Bharadwaj
(74) *Attorney, Agent, or Firm* — Schwegman, Lundberg & Woessner, P.A.

(57) ABSTRACT

Disclosed in some examples are systems, methods, and machine readable mediums which allow for the automatic creation of a skills hierarchy. The skills hierarchy comprises an organization of a standardized list of skills into a hierarchy that describes category relationships between the skills in the hierarchy. The category relationships may include no relationships, parent relationships, and child relationships. A skill may be considered a parent of another skill if the parent skill describes a broader category of skill that includes the child. Other relationships such as grandparent (e.g., a parent's parent), great-grandparent, grandchild, great grandchild and so on may be defined inferentially as well. In some examples, the constructed hierarchy may be organized with broader skills at higher levels and narrower skills at lower levels.

19 Claims, 5 Drawing Sheets

(56) References Cited

U.S. PATENT DOCUMENTS

| | | | |
|---|---|---|---|
| 2003/0187809 A1* | 10/2003 | Suermondt | G06F 19/3493 706/46 |
| 2004/0010443 A1 | 1/2004 | May et al. | |
| 2005/0015432 A1 | 1/2005 | Cohen | |
| 2005/0130110 A1 | 6/2005 | Gosling | |
| 2005/0278325 A1 | 12/2005 | Mihalcea et al. | |
| 2006/0042483 A1 | 3/2006 | Work et al. | |
| 2006/0184464 A1 | 8/2006 | Tseng et al. | |
| 2006/0218111 A1 | 9/2006 | Cohen | |
| 2006/0242014 A1 | 10/2006 | Marshall et al. | |
| 2006/0287970 A1 | 12/2006 | Chess et al. | |
| 2008/0005072 A1 | 1/2008 | Meek et al. | |
| 2008/0065481 A1 | 3/2008 | Immorlica et al. | |
| 2008/0140680 A1 | 6/2008 | Hyder et al. | |
| 2008/0172415 A1 | 7/2008 | Fakhari et al. | |
| 2008/0243628 A1 | 10/2008 | Wiseman et al. | |
| 2008/0313000 A1 | 12/2008 | Degeratu et al. | |
| 2009/0006193 A1 | 1/2009 | Forbes et al. | |
| 2010/0094879 A1* | 4/2010 | Donnelly | G06F 17/30867 707/749 |
| 2011/0161129 A1 | 6/2011 | Barsoba et al. | |
| 2011/0238591 A1 | 9/2011 | Kerr et al. | |
| 2012/0197733 A1 | 8/2012 | Skomoroch et al. | |
| 2012/0197863 A1 | 8/2012 | Skomoroch et al. | |
| 2012/0197906 A1 | 8/2012 | Landau et al. | |
| 2012/0197993 A1 | 8/2012 | Skomoroch et al. | |
| 2014/0081928 A1 | 3/2014 | Skomoroch et al. | |
| 2014/0358607 A1 | 12/2014 | Gupta et al. | |

OTHER PUBLICATIONS

"U.S. Appl. No. 13/357,171, Notice of Allowance mailed Oct. 1, 2013", 10 pgs.

"U.S. Appl. No. 13/357,171, Response filed Sep. 17, 2013 to Non Final Office Action mailed Jun. 17, 2013", 12 pgs.

"U.S. Appl. No. 13/357,302, Examiner Interview Summary mailed Mar. 17, 2016", 3 pgs.

"U.S. Appl. No. 13/357,302, Final Office Action mailed Nov. 9, 2015", 44 pgs.

"U.S. Appl. No. 13/357,302, Non Final Office Action mailed Mar. 4, 2015", 28 pgs.

"U.S. Appl. No. 13/357,302, Non Final Office Action mailed Sep. 7, 2016", 46 pgs.

"U.S. Appl. No. 13/357,302, Response filed Mar. 9, 2016 to Final Office Action mailed Nov. 9, 2015", 16 pgs.

"U.S. Appl. No. 13/357,302, Response filed Aug. 4, 2015 to Non Final Office Action mailed Mar. 4, 2015", 25 pgs.

"U.S. Appl. No. 13/357,360, Final Office Action mailed Jun. 27, 2013", 22 pgs.

"U.S. Appl. No. 13/357,360, Non Final Office Action mailed Jul. 14, 2016", 28 pgs.

"U.S. Appl. No. 13/357,360, Non Final Office Action mailed Oct. 11, 2012", 18 pgs.

"U.S. Appl. No. 13/357,360, Response filed Mar. 18, 2013 to Non Final Office Action mailed Oct. 11, 2012", 17 pgs.

"U.S. Appl. No. 13/357,360, Response Filed Oct. 14, 2016 to Non Final Office Action mailed Jul. 14, 2016", 27 pgs.

"U.S. Appl. No. 13/357,360, Response filed Nov. 20, 2013 to Final Office Action mailed Jun. 27, 2013", 18 pgs.

"U.S. Appl. No. 14/072,955, Appeal Brief filed Sep. 15, 2016", 36 pgs.

"U.S. Appl. No. 14/072,955, Examiner Interview Summary mailed Mar. 30, 2015", 3 pgs.

"U.S. Appl. No. 14/072,955, Final Office Action mailed Jan. 15, 2016", 12 pgs.

"U.S. Appl. No. 14/072,955, Final Office Action mailed Nov. 12, 2014", 11 pgs.

"U.S. Appl. No. 14/072,955, Non Final Office Action mailed May 9, 2014", 11 pgs.

"U.S. Appl. No. 14/072,955, Non Final Office Action mailed May 29, 2015", 12 pgs.

"U.S. Appl. No. 14/072,955, Preliminary Amendment filed Dec. 10, 2013", 10 pgs.

"U.S. Appl. No. 14/072,955, Response filed Apr. 13, 2015 to Final Office Action mailed Nov. 12, 2014", 13 pgs.

"U.S. Appl. No. 14/072,955, Response filed Aug. 11, 2014 to Non Final Office Action mailed May 9, 2014", 14 pgs.

"U.S. Appl. No. 14/072,955, Response filed Oct. 29, 2015 to Non Final Office Action mailed May 29, 2015", 15 pgs.

Ackerman, Mark, "Sharing Expertise: Beyond Knowledge Management", The MIT Press (Cambridge, Massachusetts), (2003), 438 pgs.

Becerra-Fernandez, Irma, "Searching for Experts on the Web: A Review of Contemporary Expertise Locator Systems", ACM Transactions on Internet Technology 6(4), (Nov. 2006), 333-355.

D'Amore, Raymond, "Expertise Community Detection", SIGIR, (Jul. 25-29, 2004), 498-499.

Dom, Byron, et al., "A Bayesian Technique for Estimating the Credibility of Question Answerers", SIAM, (2008), 399-409.

Dom, Byron, et al., "Graph-Based Ranking Algorithms for E-mail Expertise Analysis", DMKD, (Jun. 13, 2003), 42-48.

Fu, Yupeng, et al., "Finding Experts Using Social Network Analysis", IEEE/WIC/ACM International Conference on Web Intelligence, (2007), 77-80.

Grolmus, Petr, et al., "A Web-Based User-Profile Generator: Foundation for a Recommender and Expert Finding System", 8th ICCC International Conference on Electronic Publishing, (Jun. 2004), 331-342.

Haselmann, Till, et al., "Towards a Conceptual Model for Trustworthy Skills Profiles in Online Social Networks", ERCIS, (2010), 13 pgs.

Huh, Eui-Nam, et al., "A Framework of Online Community based Expertise Information Retrieval on Grid", Kyung Hee University Memo, (Aug. 11, 2008), 21 pgs.

Huh, Eui-Nam, et al., "A Framework of Online Community based Expertise Information Retrieval on Grid", Kyung Hee University Memo, (Jan. 14, 2010), 21 pgs.

John, Ajita, et al., "Collaborative Tagging and Expertise in the Enterprise", WWW2006, (May 22-26, 2006), 6 pgs.

Li, Juanzi, et al., "EOS: Expertise Oriented Search Using Social Networks", WWW 2007 / Poster Paper, (May 8-12, 2007), 1271-1272.

Lin, Ching-Yung, et al., "SmallBlue: Social Network Analysis for Expertise Search and Collective Intelligence", IEEE International Conference on Data Engineering, (2009), 1483-1486.

Lin, Chin-Yung, et al., "SmallBlue: People Mining for Expertise Search", IEEE MultiMedia, 15(1), (2008), 78-84.

Malek, Maria, et al., "Exhaustive and Guided Algorithms for Recommendation in a Professional Social Network", EISTI-Laris laboratory, PRES Cergy University, (Jul. 31, 2010), 19 pgs.

Meyer, Bertolt, et al., "skillMap: dynamic visualization of shared organizational context", Institute of Information Systems, Humboldt University Berlin, (Feb. 20, 2006), 13 pgs.

Pretschner, Alexander, "Ontology Based Personalized Search", Department of Electrical Engineering and Computer Science, University of Kansas, (1998), 125 pgs.

Stankovic, Milan, et al., "Looking for Experts? What can Linked Data do for you?", LDOW, (Apr. 27, 2010), 10 pgs.

Steggles, Andy, "Keeping Score of Your Online Member Engagement", Associations Now, [Online]. Retrieved from the Internet: <URL: http://www.asaecenter.org/Resources/ANowDetail.cfm?ItemNumber=3828>, (Jan. 2009), 7 pgs.

Tang, Jie, et al., "ArnetMiner: An Expertise Oriented Search System for Web Community", International Semantic Web Conference—ISWC, (2007), 8 pgs.

Yimam-Seid, Dawit, et al., "Expert Finding Systems for Organizations: Problem and Domain Analysis and the DEMOIR Approach", Journal of Organizational Computing and Electronic Commerce 13(1), (2003), 1-24.

(56) References Cited

OTHER PUBLICATIONS

Zhang, Jing, et al., "Expert Finding in a Social Network", Department of Computer Science and Technology, Tsinghua, University Database Systems for Advanced Applications—DASFAA, (2007), 1066-1069.

* cited by examiner

SKILLS ONTOLOGY CREATION

CLAIM OF PRIORITY

This patent application claims the benefit of priority, under 35 U.S.C. Section 119, to U.S. Provisional Patent Application 61/880,763, entitled "Skills Ontology Creation," filed on Sep. 20, 2013 to Burgess et. al., which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
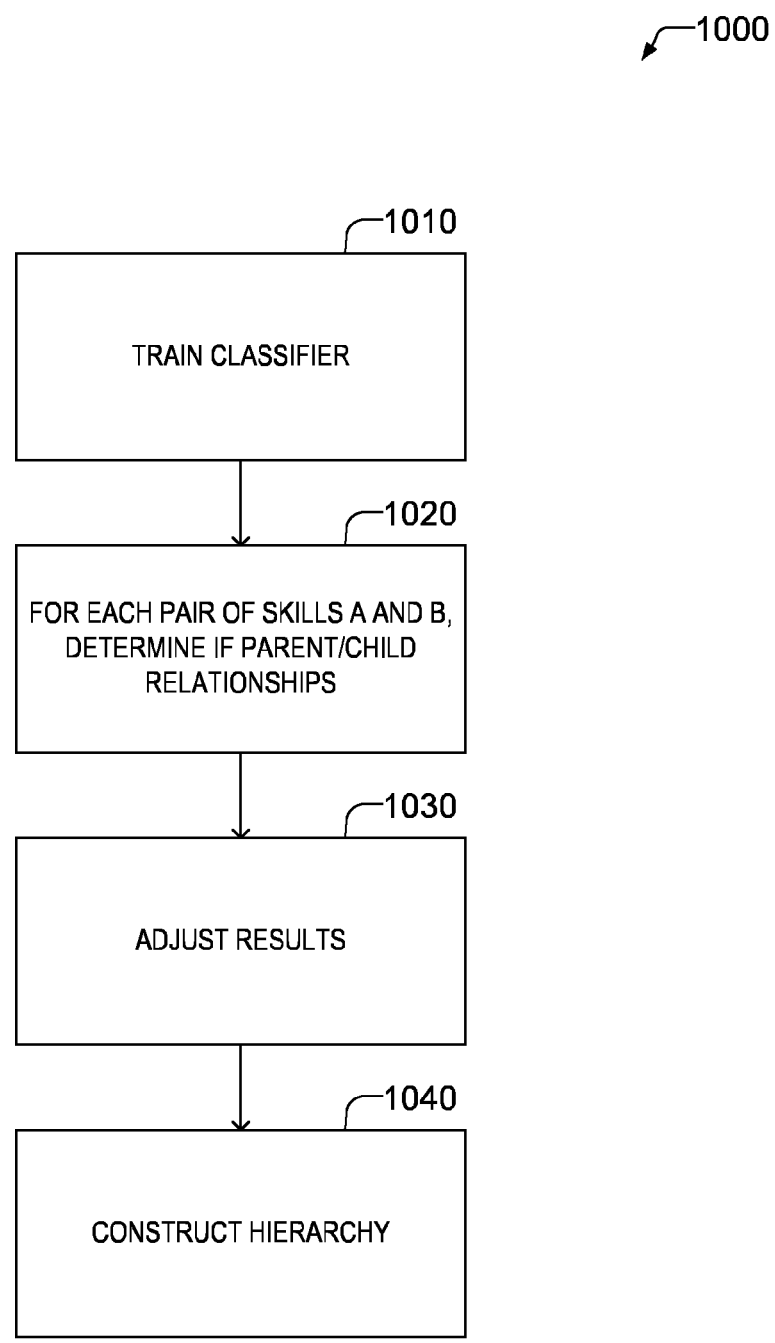
FIG. 1 is a flowchart of a method of constructing a skills hierarchy according to some examples of the present disclosure.

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service. The present inventive subject matter is generally applicable to a wide range of information services.

A social networking service is an online service, platform and/or site that allows members of the service to build or reflect social networks or social relations among members. Typically, members construct profiles, which may include personal information such as the member's name, contact information, employment information, photographs, personal messages, status information, links to web-related content, blogs, and so on. In order to build or reflect these social networks or social relations among members, the social networking service allows members to identify, and establish links or connections with other members. For instance, in the context of a business networking service (a type of social networking service), a person may establish a link or connection with his or her business contacts, including work colleagues, clients, customers, personal contacts, and so on. With a social networking service, a person may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of business networking purposes and a social networking service may likewise be used for business networking purposes as well as or in place of social networking purposes.

A connection may be formed using an invitation process in which one member "invites" a second member to form a link. The second member then has the option of accepting or declining the invitation.

In general, a connection or link represents or is otherwise associated with an information access privilege, such that a first person who has established a connection with a second person is, via the establishment of that connection, authorizing the second person to view or access certain non-publicly available portions of their profiles that may include communications they have authored. Example communications may include blog posts, messages, "wall" postings, or the like. Of course, depending on the particular implementation of the business/social networking service, the nature and type of the information that may be shared, as well as the granularity with which the access privileges may be defined to protect certain types of data may vary greatly.

Some social networking services may offer a subscription or following process to create a connection instead of, or in addition to the invitation process. A subscription or following model is where one member "follows" another member without the need for mutual agreement. Typically in this model, the follower is notified of public messages and other communications posted by the member that is followed. An example social networking service that follows this model is Twitter®—a micro-blogging service that allows members to follow other members without explicit permission. Other, connection based social networking services also may allow following type relationships as well. For example, the social networking service LinkedIn® allows members to follow particular companies.

Social networks may also provide various services to their members. One example such service is the formation of skill communities through the identification of member skills based upon information in their profiles. The formation and use of such skill communities is described in U.S. patent application Ser. No. 13/357,171 filed on Jan. 24, 2012 to Skomoroch et. al and entitled "SKILL EXTRACTION SYSTEM," which is hereby incorporated by reference in its entirety, U.S. patent application Ser. No. 13/357,302 filed on Jan. 24, 2012 to Skomoroch et. al. and entitled "SKILL RANKING SYSTEM," which is hereby incorporated by reference in its entirety, and U.S. patent application Ser. No. 13/357,360 filed on Jan. 24, 2012 to Skomoroch et. al. and entitled "SKILL CUSTOMIZATION SYSTEM," which is hereby incorporated by reference in its entirety. The referenced documents describe a social networking system that is able to automatically build a standardized list of skills, allow members to tag themselves with particular skills (or automatically tag members with particular skills), rank members with particular skills relative to one another with respect to that skill, and customize a user's experience on the social networking service based upon their skills.

The standardized list of skills that is created may contain a large list of skills. Example standardized skill lists may reach between 30,000-50,000 different skills that are not organized or categorized. The present inventors have discovered that members of the social networking service are more likely to list skills on their profiles that correlate to more granular skills rather than broad skill categories. For example, users are more likely to list "Java" then "computer programmer." Since these skills are uncategorized and users do not typically list broad skills, this limits the usefulness of certain applications of the skills functionality. For example, an advertiser or employer may not want to target users at such a granular level. Instead, they may prefer a more general level (e.g., targeting users that are skilled as a "computer programmer" instead of "Java").

Additionally, a search functionality that allows searching for members with a particular skill suffers from similar problems when users are searching for members with skills using broader concepts. If the user is looking for members skilled in computer programming, a search on just computer programming will not yield complete results. While users could search for multiple granular skills at the same time (e.g., "Java AND C++ AND Python . . . "), this requires knowing which granular skills are available which map to the general concept they are interested in. Without any organization of the skills in the standardized list, this would be difficult.

Previous attempts at solving these problems utilized unsupervised approaches that use models that do not learn from the available data. In particular these approaches assumed that data that occurs more often represents broader concepts. This assumption may be true for data on the World Wide Web, but as already noted, is not true for skill data on a social networking service. For example, on the World Wide Web it is reasonable that concepts like cats, dogs, and the other broad categories would be found in greater numbers than a specific type of cat or dog. As already explained, this assumption does not hold for skill communities in social networking services as members are more likely to list granular skills as opposed to broader concepts. Thus the sum of the number of members who list specific skills such as Java, C++, C#, Python, Ruby on Rails, and the like is much greater than the number of members who list the broader skill of "computer programming" on their member profiles. The reason for this member preference may be that members prefer to differentiate themselves by listing more narrow specialties.

Disclosed in some examples are systems, methods, and machine readable mediums which allow for the automatic creation of a skills hierarchy. The skills hierarchy comprises an organization of a standardized list of skills into a hierarchy that describes category relationships between the skills in the hierarchy. The category relationships may include no relationships, parent relationships, and child relationships. A skill may be considered a parent of another skill if the parent skill describes a broader category of skill that includes the child. Thus a skill "programming" may be a parent of a skill "C++." A skill may be both a parent of one or more other skills and a child of one or more other skills. Other relationships such as grandparent (e.g., a parent's parent), great-grandparent, grandchild, great grandchild and so on may be defined inferentially as well. For example, if a first skill "A" is a parent of skill "B" and skill "B" is a parent of skill "C" then A is skill C's grandparent. In some examples, the constructed hierarchy may be organized with broader skills at higher levels and narrower skills at lower levels.

In some examples, a machine learning, bottom-up approach may be utilized. A machine learning classifier may be trained using training data which may consist of selected example pairs of skills from the standardized list of skills, a designation of whether or not each of the example pairs is a positive example (e.g., if the first skill is the parent of the second skill) and feature data about the skills. The feature data may describe attributes about, or relationships between the skills.

Once the classifier is trained it may take as input a pair of skills (e.g., skill A and skill B) and feature data about the pair of skills and return a calculated probability that one of the skills in the set is a parent of the other skill (e.g., A is likely a parent of B, B is likely a parent of A, or neither). By running each possible pair of skills in the list of standardized skills through this machine learning classifier, a list of parent child relationships may be determined which may be utilized to build a hierarchy of skills. In some examples, the machine learning classifier may be a decision tree algorithm, such as a random forest classifier.

The disclosure herein describes this concept for skills, but one of ordinary skill in the art with the benefit of Applicants' disclosure will appreciate that the methods disclosed herein may be applicable to topics in general. Thus a skill may be considered a type of "topic."

Figure 2:
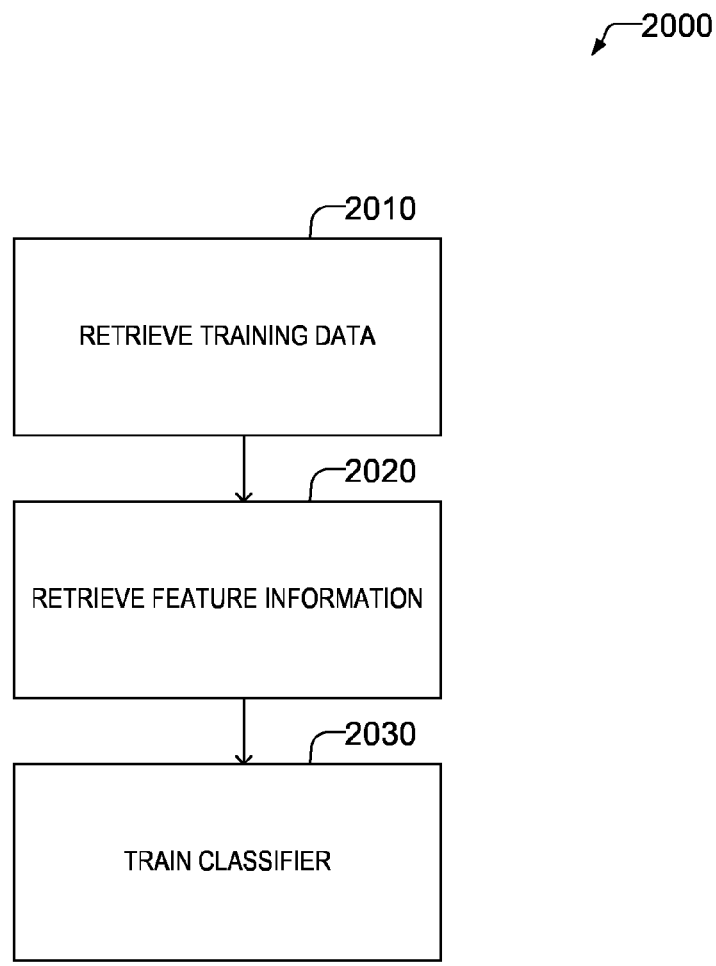
FIG. 2 is a flowchart of a method of training a skills classifier according to some examples of the present disclosure.

Turning now to FIG. 1, a flowchart of a method of automatically creating a skills hierarchy is shown according to some examples of the present disclosure. At operation 1010, the classifier which will be utilized to determine any parent/child relationships between any two pair of skills may be trained. The classifier may be trained using data collected from the social networking service and external services. FIG. 2 shows an example of a method of training the classifier used to generate the hierarchy. At operation 2010 the system selects pairs of skills from the predetermined list of skills to use as training data and classifies whether the first skill in the set is a parent of the second (and vice versa). In some examples, the training data may be randomly selected skills that are randomly paired to each other and then manually tagged with an indication that there is a parent/child relationship. For example, a large amount of this data may be processed relatively easily by making use of crowdsourcing platforms to have a large number of users complete this task. In some examples, the use of randomly selected data may produce too many negative examples—that is, since the probability that two randomly selected skills in a corpus of almost 30,000 skills would produce two skills that have a parent/child relationship is probably low. In order to effectively train the classifier other training data may be utilized.

In some examples, the examples may be determined manually. That is, a person may determine pairs of skills to train the classifier by picking them out of the standardized list of skills. This may be a tedious process however. In other examples, pre-existing hierarchy information may be utilized to automatically select pairs of skills to train the classifier. These pre-existing hierarchies may not be complete or entirely accurate. Despite this however, these pre-existing hierarchies may be good enough to generate a number of positive examples for use in training the classifier. For example, on social networks such as LinkedIn, members may have input skills information manually an older section of a member profile called a "specialties" section. This section grew over time by user convention to be a structured area to list skills. This structure typically included hierarchical information. For example, a user may have "Programming: Python, Java, Clojure." This indicates that Programming is a parent of Python, Java, and Clojure. If enough member profiles (e.g., a number above a predetermined threshold value) include a specific relationship (e.g., programming is a parent of Python), the system may have some confidence that a particular skill is a parent of another particular skill. That is, the system may have confidence that a particular example is a positive example and may be used as a training pair. Thus, the system may scan through the member profiles and extract hierarchical relationships among listed skills in the specialties (or other) section. If, for a given skill pair, more than a predetermined number of members have listed a first skill as a parent of a second skill, the skill pair may be added to the training data as a positive example whereby the first skill is a parent of the second skill.

While a LinkedIn specialties section was described, it will be appreciated by one of ordinary skill in the art with the benefit of Applicants' disclosure that any pre-existing skills hierarchy information may be utilized to assist in the creation of the training data.

In some examples, positive and negative examples are both desired for proper model training. In these examples, the positive examples from the specialties section may be mixed with randomly selected pairs of skills. In these examples, the system may have a level of confidence that the randomly selected pairs are negative examples because of the statistical improbability of being a positive example. Even if a randomly selected pair produces an unlikely parent-child match, labelling it as a negative example will not likely introduce enough noise into the classifier to affect the accuracy of the classifier.

In some examples, the machine learning classifier is a random forest classifier which may comprise a collection of decision trees. A decision tree may be a predictive model which maps observations about an item to conclusions about the item's target value. Leaves of the tree represent class labels and branches represent conjunctions of features that lead to those class labels. In these examples, to build the decision trees that make up the random forest classifier, a number of attributes or features about the training data set may be needed. The features describe attributes used by the decision tree to make the decisions. The model learns (e.g., learning is the creation of the decision trees of the random forest classifier) which of these features are important and by how much based upon the features associated with the training data set and the positive or negative classification given to the training set. Example learning algorithms may include an Iterative Dichotomiser 3 algorithm, a C4.5 algorithm, a Classification and Regression Tree (CART) algorithm, a Chi-squared Automatic Interaction Detector (CHAID) algorithm, a Multivariate adaptive regression splines (MARS) algorithm, Breiman's algorithm, or the like. A random forest classifier may build many decisions trees, each with slightly different branches. The resulting probability produced by the random forest classifier may be a combination of the results from each decision tree. The combination may be a voting algorithm, an average, or the like.

At operation 2020 the feature information related to the training data set is retrieved and may be calculated for the training data and in some examples the entire set of skills. In some examples, a number of features are used alone or in conjunction to allow the learning algorithm to properly partition the decision tree based upon the learning data set. One or more of the following features may be utilized.

One example feature is skill co-occurrence. Given a particular skill (e.g., Java), you can compute, based on co-occurrence, a conditional probability that a second skill (e.g., programming) is also listed on a member's profile. The higher that this conditional probability is, the more likely that the second skill is a parent of the first skill. In previous attempts at solving the hierarchy problem, this was used as a strict rule, whereas, here, it may be included as one of many possible factors used to train the classifier. The conditional probability based upon the co-occurrence signals a hierarchical relationship ship because if it is the case that "Java" only appears when "Programming" does then Java is most likely a child concept.

Another example feature is the use of hierarchy signals from other sources. For example, during the skills standardization process described in U.S. patent application Ser. No. 13/357,171 filed on Jan. 24, 2012 to Skomoroch et. al and entitled "SKILL EXTRACTION SYSTEM," a page from the collaborative online encyclopedia Wikipedia, run by the Wikimedia Foundation, was identified for each skill by crowdsourcing. Wikipedia categorizes and organizes its data. By retrieving the category structure for the Wikipedia page describing the skills, a Wikipedia hierarchy can be inferred. The relationships between the skills on Wikipedia may then be used as an indication of whether or not one skill is a parent or child of another skill. While the hierarchy gleaned from sites such as Wikipedia may be one signal of a parent/child relationship, the hierarchy of Wikipedia can sometimes be noisy in that the hierarchy may not always be accurate. Thus, the hierarchy is one signal, but is not dispositive. While the disclosure mentions the use of Wikipedia, any accessible and external data source that categorizes skills or other attributes may be utilized. While the example methods use "skills" as an exemplary topic, the discussed techniques are applicable to any topic, as indicated above.

Another example feature is inferred skills. U.S. patent application Ser. No. 13/357,302 filed on Jan. 24, 2012 to Skomoroch et. al. and entitled "SKILL RANKING SYSTEM," (hereby incorporated by reference in its entirety) describes a method by which skills may be tagged to a member without the member explicitly adding them to their profiles. For example, the social networking service may infer a skill of "computer programmer" to a member with explicitly tagged (e.g., the member expressly indicated that they possessed the skill) skills of "Java" and "Python." In some examples, the features may consist of the ratio of explicit mentions of the skill by the member in their profiles to implicit determinations by the social networking service. If the ratio is high (many explicit mentions to fewer implicit mentions), then the skill may be a more specific skill because of the aforementioned discovery that members are more likely to list explicit skills. Conversely, a low ratio (fewer explicit mentions to more implicit mentions) may suggest that the skill may be a broader concept. For example, we have the explicit skill ratio as:

$$\frac{\text{explicit\_count}(X)}{\text{explicit\_count}(x) + \text{implicit\_count}(x)}$$

In some examples a normalized explicit count may be utilized:

$$\frac{\text{explicit\_count}(x)}{\sum \text{explicit\_count}(y)} \text{ where } y \in \text{skills}$$

Another example feature is skill centrality. Skill graphs may be built based on co-occurrence information about the skills. Each skill may be a node, and the edges between skills may be weighted by a Jaccard distance between the skills to measure the most related skills. While this gives a measure of how related skills are, there is no indication of hierarchy. To infer a hierarchy, a closeness centrality statistic may be calculated. The centrality statistic measures how important a node is in the hierarchy. More central nodes typically would be broader concepts. In the skill graph, the distance metric between all pairs of skills is defined by the length of their shortest paths. The "farness" of a skill is defined as the sum of its distances to all other skills. Closeness, is defined as the inverse of farness. Thus, the more central a skill is, the lower its total distance to all other skills. Other centralities may be utilized in place of, or in addition to closeness centrality. For example, eigenvector centrality, betweeness centrality, closeness centrality and the like.

The feature metrics (e.g., the closeness of skills, and the like), may be computed for each of the standardized skills in the set of available skills, including the training data. In some examples, the training data that are positive examples may be filtered to remove noise based on the features of those examples. For example, the training data may be kept as a positive example if it meets one or more of the following criteria:
- it has a category, subcategory relationship on Wikipedia,
- the conditional probability of the first skill given the second skill (based on co-occurrence) is greater than a predetermined threshold (e.g., 0.6),
- if the example occurs above a predetermined threshold amount of times (e.g., 10) in user profiles, or
- if a centrality statistic is above a predetermined threshold, or the like. In some examples, this may clean the data set without biasing a particular feature.

At operation 2030, the classifier is then trained using the training data and the features. Once trained, the classifier may return a probability that there is a parent/child relationship between two pairs of skills. As already noted, example training algorithms may include an Iterative Dichotomiser 3 algorithm, a C4.5 algorithm, a Classification and Regression Tree (CART) algorithm, a Chi-squared Automatic Interaction Detector (CHAID) algorithm, a Multivariate adaptive regression splines (MARS) algorithm, Breiman's algorithm, or the like. As already noted a random forest classifier may build many decisions trees, each with slightly different branches. The resulting probability produced by the random forest classifier may be a combination of the results from each decision tree. The combination may be a voting algorithm, an average, or the like.

Turning back to FIG. 1, now that the classifier is trained at operation 1010, at operation 1020, the classifier is run for each pair of standardized skills that the system is interested in organizing. In some examples, this may be all the standardized skills. The classifier takes as input two skills and the feature information about the two skills and returns a probability that a first skill is a parent of the second skill. For example, if the input skills are A and B, then the classifier may output the probability that A is a parent of B. In some examples, the classifier may be run twice per pair, once with (A, B) as an input, and once with (B, A) as the input. The classifier may utilize the skills and any feature information that may be collected about the skills. In examples in which the classifier is a random forest classifier, the feature information may be utilized by the decision trees of the random forest classifier to traverse the decision tree (e.g., determine which branch to take) to arrive at a probability.

At operation 1030, the results may be adjusted, or culled. In this operation, certain irregularities and other undesirable issues are corrected. For example, a reciprocity rule may be enforced. The reciprocity rule covers the situation where the probability of A being the parent of B is high and so is the probability of B being a parent of A. In some examples, the rule may be as follows: If the probability of ParentOf(A,B) >=0.5 and ParentOf(B,A)<0.5 then keep A->B and delete B->A, otherwise ignore the relationships. If the probability of ParentOf(A,B)>=0.5 and the probability of ParentOf(B, A)>=0.5 then in some examples the relationship with the higher probability may be kept, while the lower probability may be pruned.

Another filter that may be applied may be a transitivity filter. If skill A is a parent of B and C, and skill B is a parent of C, then we can ignore the relationship between A and C, because they are implicitly connected through B.

Based on these filtered results, a hierarchical structure may be built at operation 1040. The hierarchical structure may be built by starting with skills that have no parent relationships at the top. These may be called level 1 skills (or the highest layer skills). Skills which have a high probability of being a child of the parents of the level 1 skills are added as children of their respective parent level 1 skills (e.g., in a tree structure). This process repeats until all nodes have been added to the hierarchy.

Figure 3:
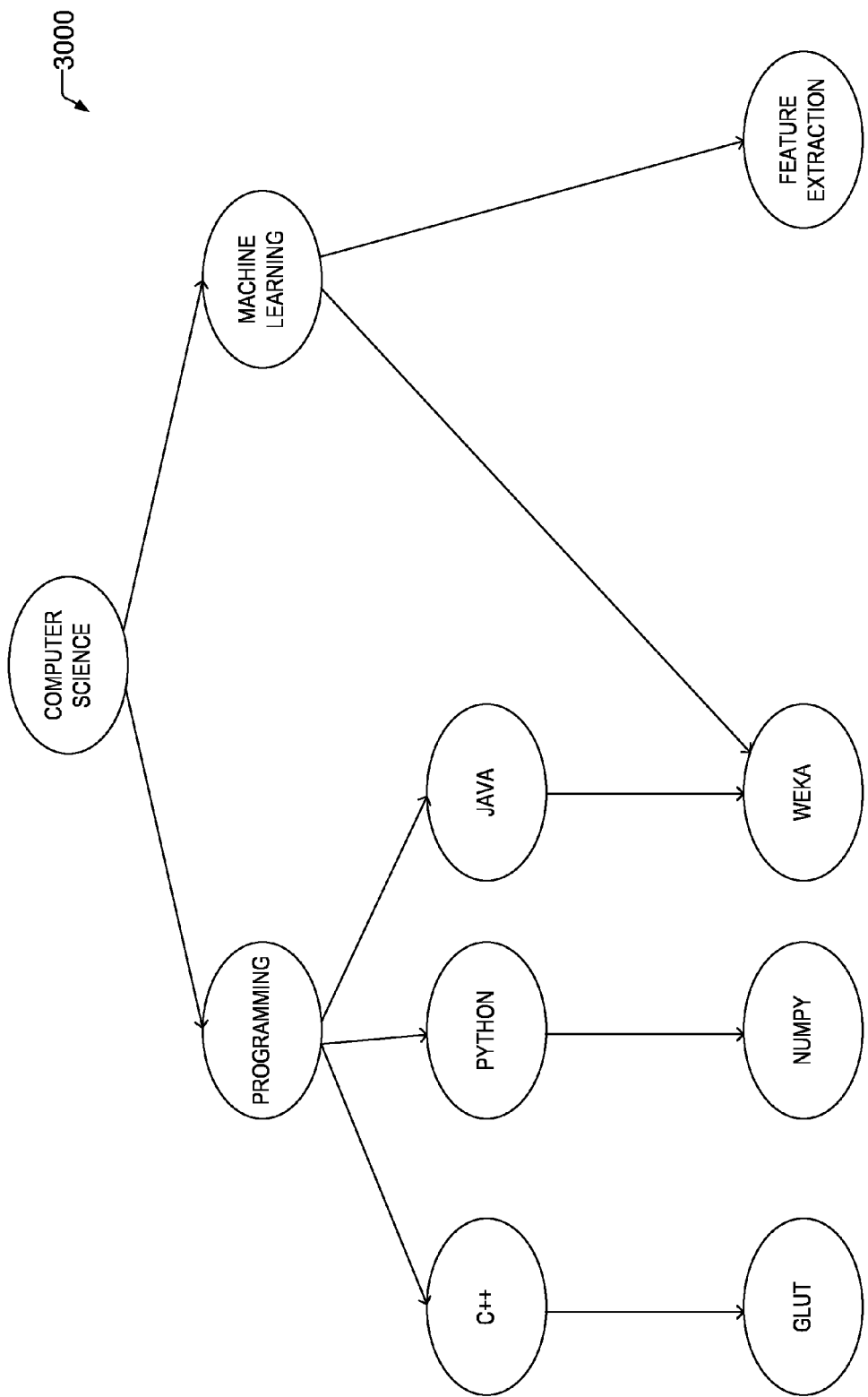
FIG. 3 is a portion of a skills hierarchy according to some examples of the present disclosure.

A portion of an example hierarchical structure is shown in FIG. 3. An example partial output of the classifier used to build the hierarchy in FIG. 3, where ParentOf(A,B) returns the probability that skill A is a parent of skill B may be:
ParentOf(Computer Science, Programming)=0.8
ParentOf(Programming, Computer Science)=0.2
ParentOf(Computer Science, Machine Learning)=0.7
ParentOf(Machine Learning, Computer Science)=0.3
ParentOf(Computer Science, C++)=0.7
ParentOf(C++, Computer Science)=0.2
ParentOf(Programming, C++)=0.8
ParentOf(C++, Programming)=0.2

In FIG. 3 a portion of a hierarchy for a computer science skill is shown according to some examples of the present disclosure. Computer science is determined to be a parent of programming based upon the probability of ParentOf(Computer Science, Programming) being greater than ParentOf (Programming, Computer Science) (e.g., 0.8>0.2). The same holds true for Computer Science and Machine Learning. Machine learning is a parent of Weka and Feature Extraction. Likewise Programming is a parent of C++, Python, and Java. C++ is a parent of GLUT, Python is a parent of NUMPY, and Java is a parent of Weka. Notice that a node may have multiple parents, as well as multiple children. Weka, then, is both a third level node, and a second level node. In the example shown in FIG. 3 however, C++ is not also a child of Computer Science (despite the high probability) because it is also a child of Programming, which is itself a child of Computer Science.

Example usages of the hierarchy may include users who may wish to target members who know "programming" rather than just people who know "Java" or "Python." Similarly, when searching for members, it may be useful to present a hierarchy of skills and allow members to drill down and navigate based on this hierarchy. For example, members may be able to search for other members based upon "programming" rather than just people who know "Java" or "Python." Employers seeking qualified employees may also do the same. Additionally, members may utilize the hierarchy to add skills to their profiles. In other examples, recommendation services may wish to recommend various news articles, content, other members (e.g., recommendations to connect with other members), and the like based upon the skills implicitly or explicitly referenced in a member's profile and in some examples, the recommendations may be based upon not the specific skills, but the categories of skills (e.g., the recommendations may be based upon higher layers of the hierarchy). In some examples, the parent or child relationships may be used to implicitly or explicitly add (or tag) members with a particular skill. For example, if a user lists themselves as knowing C++, then the Computer Science and/or Programming skills may be explicitly or implicitly added to their profiles.

Figure 4:
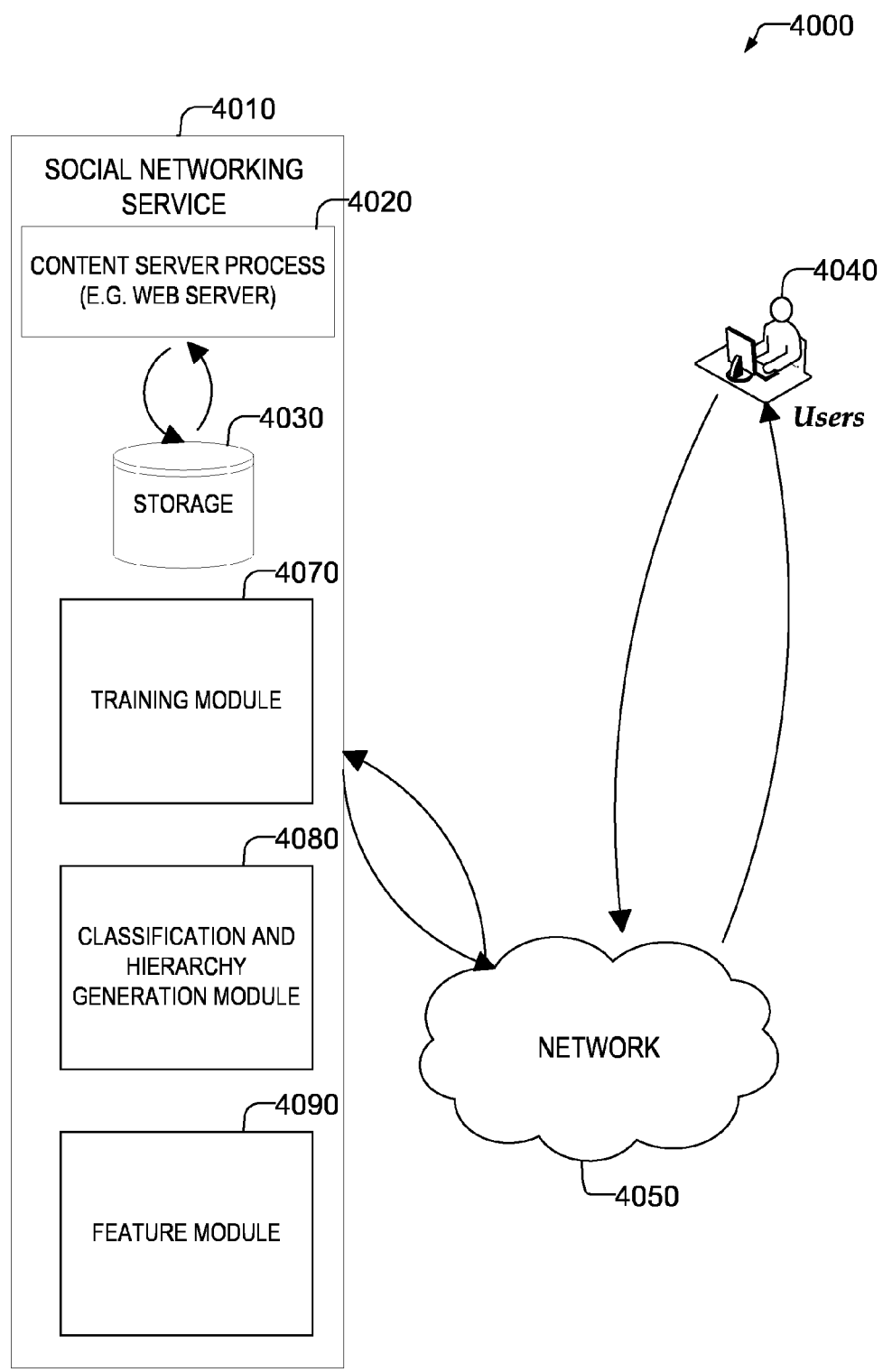
FIG. 4 is a schematic of a social networking system according to some examples of the present disclosure.

Turning now to FIG. 4, an example social networking system 4000 is shown. Social networking service 4010 may contain a content server process 4020. Content server process 4020 may communicate with storage 4030 and may communicate with one or more users 4040 through a network 4050. Content server process 4020 may be responsible for the retrieval, presentation, and maintenance of member profiles stored in storage 4030. Content server process 4020 in one example may include or be a web server that fetches or creates internet web pages. Web pages may be or include Hyper Text Markup Language (HTML), eXtensible Markup Language (XML), JavaScript, or the like. The web pages may include portions of, or all of, a member profile at the request of users 4040. The web pages may include search functionality—for example, the ability to search for particular members, search for members with particular skills, browse skill hierarchies, and the like.

Users 4040 may include one or more members, prospective members, or other users of the social networking service 4010. Users 4040 access social networking service 4010 using a computer system through a network 4050. The network may be any means of enabling the social networking service 4010 to communicate data with users 4040. Example networks 4050 may be or include portions of one or more of: the Internet, a Local Area Network (LAN), a Wide Area Network (WAN), wireless network (such as a wireless network based upon an IEEE 802.11 family of standards), a Metropolitan Area Network (MAN), a cellular network, or the like.

Social networking service 4010 may include a feature module 4090 which may collect, generate, and/or determine the feature information for the standardized list of skills as already described based upon the social networking service data in storage 4030, and in some examples, based upon other services (e.g., Wikipedia) accessible across network 4050. Training module 4070 may select the training data sets as already described based upon profiles in storage 4030, data from other data services (e.g., scraped from other hierarchies such as Wikipedia) accessible over network 4050, or the like. The feature information gathered by the feature module 4090 and the training data gathered by the training module 4070 may be utilized by the training module 4070 to train the classifier. Classification and hierarchy generation module 4080 may contain the classifier, which may classify pairs of skills as already explained. Classification and hierarchy generation module 4080 may take the probabilities for each pair of skills generated by the classifier and place the skills in the hierarchy based upon these probabilities. The hierarchy may be stored in any suitable data structure such as a hash table, a tree structure, or the like. Content server process 4020 may utilize the hierarchy to provide various customized features to users 4040 as already disclosed.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computing devices (e.g., a standalone, client or server computing device) or one or more hardware modules of a computing device (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing device can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 5:
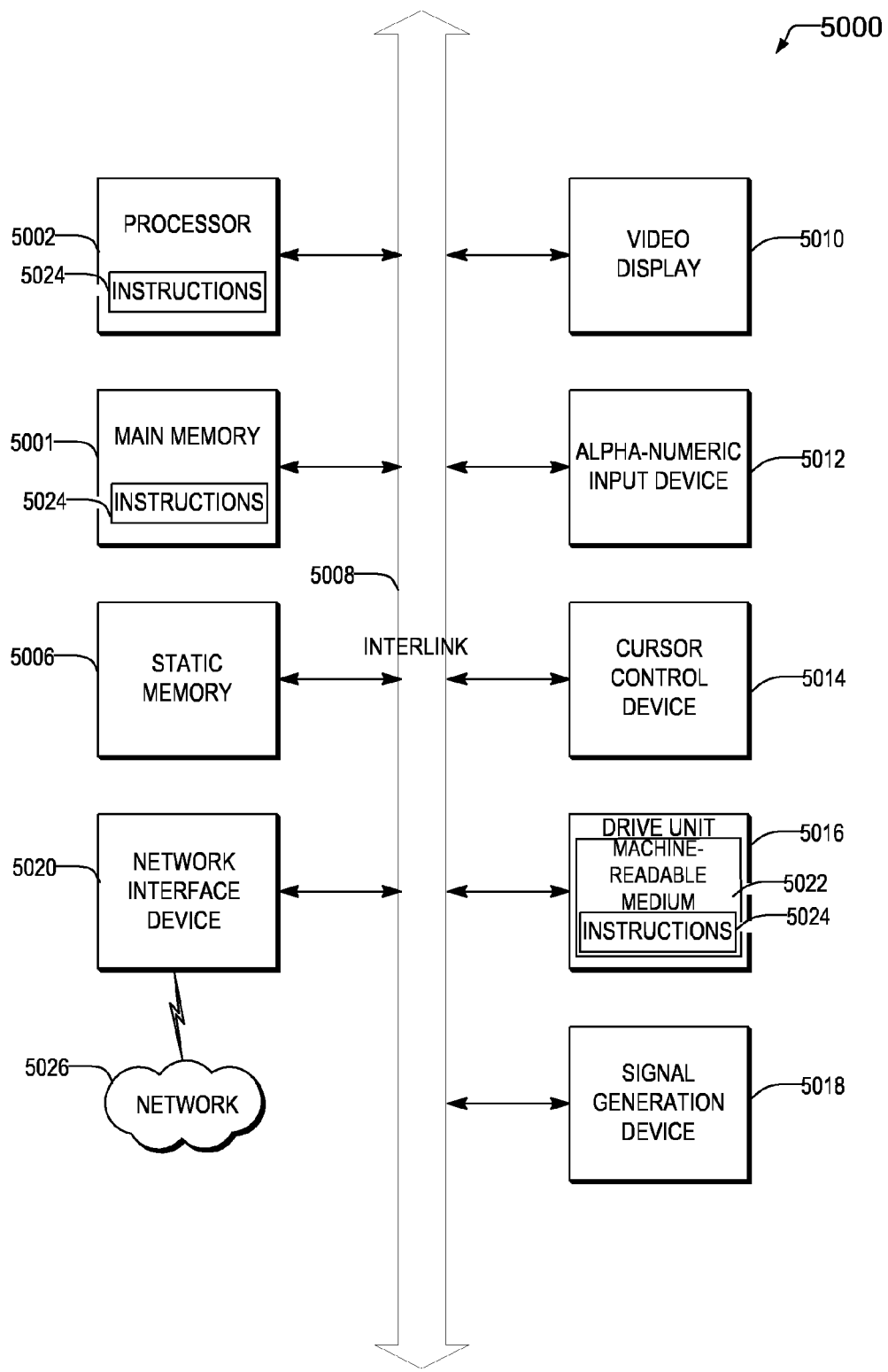
FIG. 5 is a schematic of a machine according to some examples of the present disclosure.

FIG. 5 is a block diagram of machine in the example form of a computing device 5000 within which instructions, for causing the machine to perform any one or more of the methodologies discussed herein, may be executed. For example, any one of the components shown in FIG. 4 may be or contain one or more of the components described in FIG. 5. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a smartphone, a web appliance, a network router, switch or bridge, or any machine capable of executing instructions (sequential or otherwise) that specify actions to be taken by that machine. For example the machine may be configured to include any one or more of the components shown in FIG. 4. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 5 or only a subset of the components shown in FIG. 5. A set, as used in this specification includes one or more members.

The example computing device 5000 includes a processor 5002 (e.g., a central processing unit (CPU), a graphics processing unit (GPU) or both), a main memory 5001 and a static memory 5006, which communicate with each other via a interlink (e.g., a bus) 5008. The computing device 5000 may further include a video display unit 5010 (e.g., a liquid crystal display (LCD) or a cathode ray tube (CRT)). The computing device 5000 may also include an alphanumeric input device 5012 (e.g., a keyboard), a user interface (UI) navigation device 5014 (e.g., a cursor control device such as a mouse), a disk drive unit 5016, a signal generation device 5018 (e.g., a speaker) and a network interface device 5020.

Machine-Readable Medium

The disk drive unit 5016 includes a machine-readable medium 5022 on which is stored one or more sets of instructions and data structures (e.g., software) 5024 embodying or used by any one or more of the methodologies or functions described herein. The instructions 5024 may also reside, completely or at least partially, within the main memory 5001, static memory 5006, and/or within the processor 5002 during execution thereof by the computing device 5000, the main memory 5001 and the processor 5002 also constituting machine-readable media.

While the machine-readable medium 5022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media, Random Access Memory (RAM) and the like. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 5024 may further be transmitted or received over a communications network 5026 using a transmission medium. The instructions 5024 may be transmitted using the network interface device 5020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 5020 may wirelessly transmit data and may include an antenna.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

OTHER NOTES AND EXAMPLES

Example 1 includes subject matter (such as a method, means for performing acts, machine readable medium including instructions) for creating a hierarchy of topics, comprising: training a topic classifier using training data, the training data comprising a plurality of trained topic pairs, each topic in the plurality of trained topic pairs selected from a predetermined list of topics; determining for each particular topic pair in a target set of topic pairs, using the topic classifier, a probability that the first topic in each particular topic pair is a parent of the second topic in each particular topic pair, the first and second topics included in the predetermined list of topics; collecting, in response to the determining the probability for each particular topic pair, a collection of probabilities for the target set of topic pairs; constructing a hierarchy of topics based upon the collection of probabilities for the target set of topic pairs.

In example 2, the subject matter of example 1 may optionally include wherein the topics are skills.

In example 3, the subject matter of any one or more of examples 1-2 may optionally include wherein the topic classifier is a random forest classifier.

In example 4, the subject matter of any one or more of examples 1-3 may optionally include wherein the topic classifier takes as input feature data describing relationships between two or more topics and training the topic classifier comprises training the topic classifier using the training data and the feature data.

In example 5, the subject matter of any one or more of examples 1-4 may optionally include wherein the topic classifier utilizes feature data in determining the probability that for each particular topic pair in the target set, the first topic in the particular topic pair is a parent of the second topic in the particular topic pair.

In example 6, the subject matter of any one or more of examples 1-5 may optionally include wherein the feature data includes data on a probability of co-occurrence in member profiles of a social networking service between the first and second topics.

In example 7, the subject matter of any one or more of examples 1-6 may optionally include wherein the feature data includes a closeness centrality metric based upon the probability of co-occurrence between the first and second topics.

In example 8, the subject matter of any one or more of examples 1-7 may optionally include wherein the feature data includes a pre-existing hierarchy describing a parent-child relationship between the first and second topics.

In example 9, the subject matter of any one or more of examples 1-8 may optionally include wherein the feature data includes a ratio of a number of times the first topic was explicitly included in member profiles of a social networking service to a number of times the first topic was implicitly included in member profiles of the social networking service.

Example 10 includes or may optionally be combined with the subject matter of any one of examples 1-9 to include subject matter (such as a device, system, apparatus, or machine) for creating a hierarchy of topics, comprising: a training module configured to: train a topic classifier using training data, the training data comprising a plurality of trained topic pairs, each topic in the plurality of trained topic pairs selected from a predetermined list of topics; and a hierarchy generation module configured to: determining for each particular topic pair in a target set of topic pairs, using the topic classifier, a probability that the first topic in each particular topic pair is a parent of the second topic in each particular topic pair, the first and second topics included in the predetermined list of topics; collecting, in response to the determining the probability for each particular topic pair, a collection of probabilities for the target set of topic pairs; and constructing a hierarchy of topics based upon the collection of probabilities for the target set of topic pairs.

In example 11, the subject matter of any one or more of examples 1-10 may optionally include wherein the topics are skills.

In example 12, the subject matter of any one or more of examples 1-11 may optionally include wherein the topic classifier takes as input feature data describing relationships between two or more topics and training the topic classifier comprises training the topic classifier using the training data and the feature data.

In example 13, the subject matter of any one or more of examples 1-12 may optionally include wherein the topic classifier utilizes feature data in determining the probability that for each particular topic pair in the target set, the first topic in the particular topic pair is a parent of the second topic in the particular topic pair.

In example 14, the subject matter of any one or more of examples 1-13 may optionally include wherein the feature data includes data on a probability of co-occurrence in member profiles of a social networking service between the first and second topics.

In example 15, the subject matter of any one or more of examples 1-14 may optionally include wherein the feature data includes a closeness centrality metric based upon the probability of co-occurrence between the first and second topics.

In example 16, the subject matter of any one or more of examples 1-15 may optionally include wherein the feature data includes a pre-existing hierarchy describing a parent-child relationship between the first and second topics.

In example 17, the subject matter of any one or more of examples 1-16 may optionally include wherein the feature data includes a ratio of a number of times the first topic was explicitly included in member profiles of a social networking service to a number of times the first topic was implicitly included in member profiles of the social networking service.

What is claimed is:

1. A method for creating a hierarchy of skills, the method comprising:
    training a skill classifier using training data, the training data comprising a plurality of skill pairs, each skill in the plurality of skill pairs selected from a predetermined list of skills;
    determining for each particular skill pair in a target set of skill pairs, using the skill classifier and feature data, a probability that a first skill in each particular skill pair is a parent of a second skill in each particular skill pair, the first and second skills included in the predetermined list of skills, wherein the feature data includes a ratio of a number of times the first skill was explicitly included in member profiles of a social networking service to a number of times the first skill was implicitly included in member profiles of the social networking service;
    collecting, in response to the determining the probability for each particular skill pair, a collection of probabilities for the target set of skill pairs; and
    constructing a hierarchy of skills based upon the collection of probabilities for the target set of skill pairs.

2. The method of claim 1, wherein the skill classifier is a random forest classifier.

3. The method of claim 1, wherein the skill classifier takes as input second feature data describing relationships between two or more skills and training the skill classifier comprises training the skill classifier using the training data and the second feature data.

4. The method of claim 1, wherein the feature data includes data on a probability of co-occurrence in member profiles of a social networking service between the first and second skills.

5. The method of claim 4, wherein the feature data includes a closeness centrality metric based upon the probability of co-occurrence between the first and second skills.

6. The method of claim 1, wherein the feature data includes a pre-existing hierarchy describing a parent-child relationship between the first and second topics.

7. The method of claim 1, wherein the training data comprises feature data and for each particular pair of skills in the training data a designation of whether a first skill in the particular pair of skills is a parent skill of a second skill in the particular pair of skills.

8. The method of claim 7, wherein the designation is determined from hierarchy information in a free text section of a plurality of member profiles of the social networking service.

9. A non-transitory machine-readable medium for creating a hierarchy of topics, the machine-readable medium comprising instructions, which when performed by a machine, causes the machine to perform operations comprising:

training a skill classifier using training data, the training data comprising a plurality of skill pairs, each topic in the plurality of trained topic pairs selected from a predetermined list of skills;

determining for each particular skill pair in a target set of skill pairs, using the skill classifier and feature data, a probability that a first skill in each particular skill pair is a parent of a second skill in each particular skill pair, the first and second skills included in the predetermined list of skills, wherein the feature data includes a ratio of a number of times the first skill was explicitly included in member profiles of a social networking service to a number of times the first skill was implicitly included in member profiles of the social networking service;

collecting, in response to the determining the probability for each particular skill pair, a collection of probabilities for the target set of skill pairs; and constructing a hierarchy of skills based upon the collection of probabilities for the target set of skill pairs.

10. The machine-readable medium of claim 9, wherein the skill classifier is a random forest classifier.

11. The machine-readable medium of claim 9, wherein the skill classifier takes as input second feature data describing relationships between two or more skills and the operations for training the topic classifier comprises training the topic classifier using the training data and the second feature data.

12. The machine-readable medium of claim 9, wherein the training data comprises feature data and for each particular pair of skills in the training data a designation of whether a first skill in the particular pair of skills is a parent skill of a second skill in the particular pair of skills.

13. The machine-readable medium of claim 12, wherein the designation is determined from hierarchy information in a free text section of a plurality of member profiles of the social networking service.

14. A system for creating a hierarchy of topics, the system comprising:
 a processor;
 a memory communicatively coupled to the processor and including instructions, when performed by the processor cause the system to perform operations to:

training a skill classifier using training data, the training data comprising a plurality of skill pairs, each skill in the plurality of skill pairs selected from a predetermined list of skills;

determining for each particular skill pair in a target set of skill pairs, using the skill classifier and feature data, a probability that a first skill in each particular skill pair is a parent of a second skill in each particular skill pair, the first and second skills included in the predetermined list of skills; wherein the feature data includes a ratio of a number of times the first skill was explicitly included in member profiles of a social networking service to a number of times the first skill was implicitly included in member profiles of the social networking service;

collecting, in response to the determining the probability for each particular skill pair, a collection of probabilities for the target set of skill pairs; and constructing a hierarchy of skills based upon the collection of probabilities for the target set of skill pairs.

15. The system of claim 14, wherein the skill classifier takes as input second feature data describing relationships between two or more skills and training the skill classifier comprises training the skill classifier using the training data and the second feature data.

16. The system of claim 14, wherein the feature data includes data on a probability of co-occurrence in member profiles of a social networking service between the first and second skills.

17. The system of claim 16, wherein the feature data includes a closeness centrality metric based upon the probability of co-occurrence between the first and second skills.

18. The system of claim 14, wherein the training data comprises feature data and for each particular pair of skills in the training data a designation of whether a first skill in the particular pair of skills is a parent skill of a second skill in the particular pair of skills.

19. The system of claim 18, wherein the designation is determined from hierarchy information in a free text section of a plurality of member profiles of the social networking service.

* * * * *